(12) United States Patent
Kasugai et al.

(10) Patent No.: US 8,953,232 B2
(45) Date of Patent: Feb. 10, 2015

(54) IMAGE READER

(71) Applicant: Brother Kogyo Kabushiki Kaisha, Nagoya-shi, Aichi-ken (JP)

(72) Inventors: Atsushi Kasugai, Nagoya (JP); Kazuma Hojo, Inazawa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/164,671

(22) Filed: Jan. 27, 2014

(65) Prior Publication Data

US 2014/0139897 A1 May 22, 2014

Related U.S. Application Data

(63) Continuation-in-part of application No. PCT/JP2012/068801, filed on Jul. 25, 2012.

(30) Foreign Application Priority Data

Jul. 27, 2011 (JP) ................................. 2011-164761

(51) Int. Cl.
*H04N 1/46* (2006.01)
*H04N 1/04* (2006.01)
*H04N 1/00* (2006.01)
(Continued)

(52) U.S. Cl.
CPC ......... *H04N 1/00087* (2013.01); *H04N 1/1017* (2013.01); *H04N 1/1061* (2013.01); *H04N 1/1026* (2013.01); *H04N 1/1043* (2013.01); *H04N 1/1048* (2013.01); *H04N 1/193* (2013.01);
(Continued)

(58) Field of Classification Search
None
See application file for complete search history.

(56) References Cited

U.S. PATENT DOCUMENTS 5,216,525 A * 6/1993 Lant .............................. 358/496
7,251,062 B2 7/2007 Harris et al.
(Continued)

FOREIGN PATENT DOCUMENTS

JP H11-46302 A 2/1999
JP 2000-092289 A 3/2000
(Continued)

OTHER PUBLICATIONS

International Search Report and Written Opinion issued in corresponding International Application No. PCT/JP2012/068801 dated Oct. 9, 2012.

(Continued)

*Primary Examiner* — Madelein A Nguyen
(74) *Attorney, Agent, or Firm* — Banner & Witcoff, Ltd.

(57) ABSTRACT

An image reader includes a moving portion, a transparent plate, a reference member, and a detecting portion. The reference member that is provided in at least one of a position that is not the manuscript contact surface in the first scanning direction and a position that is further to a side in a first direction from the transparent plate than the manuscript contact surface. The detecting portion is supported by the moving portion and includes a plurality of detecting elements, in the second scanning direction, detecting reflected light of light irradiated from a light source. A height position of the detecting portion when the reference member is on the side in the first direction is further to the side in the first direction than a height position of the detecting portion when the manuscript contact surface is on the side in the first direction.

6 Claims, 8 Drawing Sheets

(51) Int. Cl.
*H04N 1/10* (2006.01)
*H04N 1/193* (2006.01)

(52) U.S. Cl.
CPC .. *H04N 2201/044* (2013.01); *H04N 2201/0456* (2013.01); *H04N 2201/0081* (2013.01)
USPC ............................ 358/504; 358/505; 358/497

(56) References Cited

U.S. PATENT DOCUMENTS

| | | | |
|---|---|---|---|
| 7,477,426 B2 * | 1/2009 | Guan et al. | 358/474 |
| 7,843,612 B2 * | 11/2010 | Kimura et al. | 358/474 |
| 8,159,731 B2 | 4/2012 | Sato et al. | |
| 8,223,406 B2 | 7/2012 | Osakabe | |
| 8,300,282 B2 | 10/2012 | Nakakita et al. | |
| 8,355,645 B2 * | 1/2013 | Mizumukai | 399/72 |
| 8,693,060 B2 * | 4/2014 | Ito | 358/3.26 |
| 8,699,102 B2 * | 4/2014 | Sumioka | 358/498 |
| 8,749,858 B2 * | 6/2014 | Koda | 358/498 |
| 8,749,859 B2 * | 6/2014 | Sumioka et al. | 358/498 |
| 8,780,367 B2 * | 7/2014 | Yokota et al. | 358/1.13 |
| 8,830,541 B2 * | 9/2014 | Ozawa et al. | 358/475 |
| 2001/0033397 A1 * | 10/2001 | Kimura | 358/474 |
| 2002/0140750 A1 * | 10/2002 | Yoshiyama et al. | 347/7 |
| 2004/0080791 A1 * | 4/2004 | Beck et al. | 358/406 |
| 2004/0165225 A1 | 8/2004 | Harris et al. | |
| 2005/0024410 A1 * | 2/2005 | Subirada et al. | 347/16 |
| 2007/0076035 A1 * | 4/2007 | Yoshida | 347/16 |
| 2007/0146405 A1 * | 6/2007 | Yoshida | 347/16 |
| 2008/0180761 A1 | 7/2008 | Sato et al. | |
| 2010/0053678 A1 * | 3/2010 | Yoshihisa et al. | 358/1.15 |
| 2010/0245950 A1 | 9/2010 | Osakabe | |
| 2011/0063640 A1 | 3/2011 | Tanaka | |
| 2011/0292469 A1 * | 12/2011 | Takahashi | 358/474 |
| 2012/0206750 A1 * | 8/2012 | Murray | 358/1.13 |
| 2013/0135650 A1 * | 5/2013 | Kuronuma | 358/1.13 |

FOREIGN PATENT DOCUMENTS

| | | |
|---|---|---|
| JP | 2004-252451 A | 9/2004 |
| JP | 2008-124623 A | 5/2008 |
| JP | 2008-193171 A | 8/2008 |
| JP | 2010-239489 A | 10/2010 |
| JP | 2010-239490 A | 10/2010 |
| JP | 2011-064984 A | 3/2011 |
| JP | 2013012891 A * | 1/2013 |

OTHER PUBLICATIONS

International Preliminary Report on Patentability issued in International Application No. PCT/JP2012/068801 mailed Feb. 6, 2014.

* cited by examiner

IMAGE READER

CROSS-REFERENCE TO RELATED APPLICATION

This application is a continuation-in-part of International Application No. PCT/JP2012/068801, filed Jul. 25, 2012, which claims priority from Japanese Patent Application No. 2011-164761, filed on Jul. 27, 2011. This disclosure of the foregoing application is hereby incorporated by reference in its entirety.

BACKGROUND

The present disclosure relates to an image reader that detects reflected light from a manuscript.

In known art, an image reader is known that detects light reflected from a manuscript in order to convert the manuscript to image data. In general, when the image reader reads the manuscript, the image reader irradiates light onto a manuscript that is placed on a manuscript platen and detects light reflected back from the manuscript using a sensor that includes a plurality of image pickup devices. However, variations occur in output signals of each of the image pickup devices. In order to reduce the influence of these variations, calibration is performed in the image reader. For example, an image forming apparatus is known in which a reference white plate is provided on a top surface of an end portion of a manuscript platen that is formed of glass. The image forming apparatus reads the reference white plate before reading the manuscript placed on the manuscript platen and performs so-called shading correction (that is equivalent to calibration). When the reference white plate is provided on the top surface of the manuscript platen as in the image forming apparatus, an environment between the manuscript placed on the manuscript platen and a detecting element (a distance, a thickness of the manuscript platen and so on) is the same as an environment between the reference white plate and the detecting element. Thus, a focal point of the detecting element matches both the manuscript and the reference white plate. As a result, the image forming apparatus can perform the reading of the manuscript and the calibration in an appropriate manner.

SUMMARY

With the above-described image forming apparatus, the reference white plate is provided on the top surface of the manuscript platen. As a result, the reference white plate protrudes above the manuscript platen. Thus, for example, when a configuration is adopted that is the same as that of an image reader that can be placed on the upper side of a manuscript that is placed on a desktop and can read the manuscript, when the image reader is placed on the upper side of the manuscript on the desktop, the reference white plate that protrudes from the manuscript platen comes into contact with the desk. Thus, the manuscript floats above the manuscript platen and becomes displaced from the focal point of the detecting element and there are cases in which the image reader cannot accurately read the manuscript. If it is assumed that the reference white plate is provided below the manuscript platen such that the reference white plate does not protrude from the manuscript platen, the reference white plate comes closer to the detecting element. Thus, there is a displacement between positions, in the height direction, of the top surface of the manuscript platen and the reference white plate, and it is difficult to focus the focal point on both the reference white plate and the manuscript. As a result, there are cases in which it is difficult to perform both the calibration and the reading of the manuscript in an accurate manner.

It is an object of the present disclosure to provide an image reader on which a member used for calibration does not protrude from a manuscript platen, and that can accurately perform calibration and accurately read a manuscript.

Exemplary embodiment provides an image reader that includes a moving portion, a transparent plate, a reference, and a detecting portion. The moving portion is configured to move in a first scanning direction. The transparent plate has a facing surface and an opposite surface. The opposite surface is a surface on an opposite side to the facing surface and of which at least a part is a manuscript contact surface. The manuscript contact surface is a surface coming into contact with a manuscript. The manuscript is a reading target. The reference member is provided in at least one of a position that is not the manuscript contact surface in the first scanning direction and a position that is further to a side in a first direction from the transparent plate than the manuscript contact surface. A height position of the reference member is the same as that of the manuscript contact surface. The height position is a position in a direction that is orthogonal to the first scanning direction and to a second scanning direction that is orthogonal to the first scanning direction. A color of a first surface is on the side in the first direction including a reference color that is used for calibration. The first direction is a direction from the opposite surface toward the facing surface. The detecting portion faces the facing surface and includes a plurality of detecting elements in the second scanning direction. A plurality of detecting elements is configured to detect reflected light of light irradiated from a light source. The detecting portion is supported by the moving portion and is configured to move in the first scanning direction. A height position of the detecting portion when the reference member is on the side in the first direction is further to the side in the first direction than a height position of the detecting portion when the manuscript contact surface is on the side in the first direction.

BRIEF DESCRIPTION OF THE DRAWINGS

Embodiments of the disclosure will be described below in detail with reference to the accompanying drawings in which.

DETAILED DESCRIPTION OF EMBODIMENTS

Figure 1:
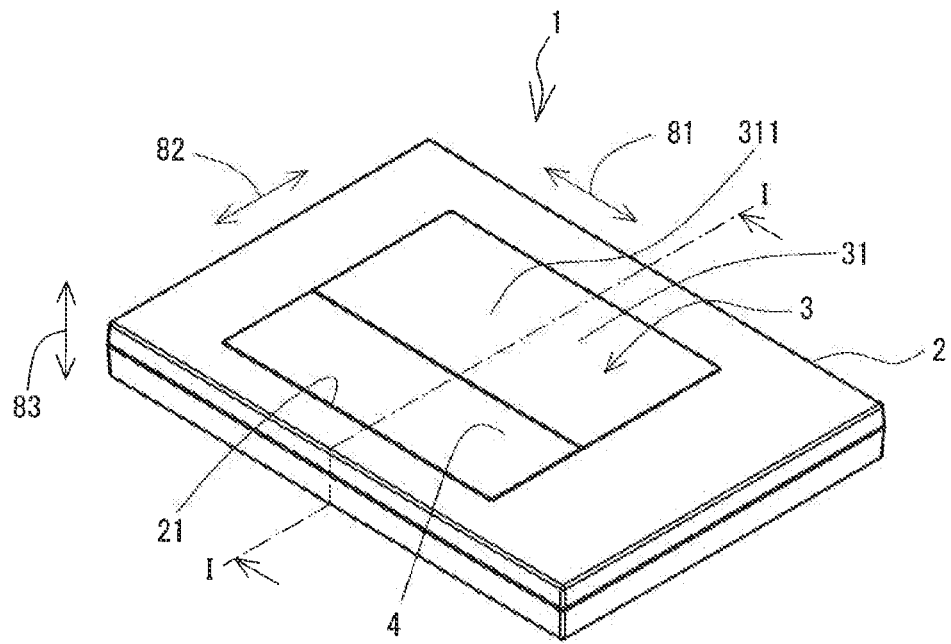
FIG. 1 is a perspective view of a scanner 1.

Hereinafter, embodiments of the present disclosure will be explained with reference to the drawings. The drawings referred to are used to explain technological features that can be adopted by the present disclosure and are not intended to limit the scope of the present disclosure. In the following explanation, the upper side, the lower side, the upper right side, the lower left side, the lower right side and the upper left side of FIG. 1 define, respectively, the upper side, the lower side, the right side, the left side, the front side and the rear side of a scanner 1. A direction in which detecting elements 51 (refer to FIG. 3) that will be explained later are arranged (the front-rear direction in the present embodiment) is referred to as a main scanning direction 81 (refer to FIG. 1). A direction in which a detecting portion 5 (refer to FIG. 2 and FIG. 3) that will be explained later moves (the left-right direction in the present embodiment) is referred to as a sub-scanning direction 82 (refer to FIG. 1). A direction that is orthogonal to the main scanning direction 81 and to the sub-scanning direction 82 (the up-down direction in the present embodiment) is referred to as a height direction 83 (refer to FIG. 1). Positions of each of members in the height direction 83 are referred to as height positions.

An overview of the scanner 1 according to a first embodiment will be explained with reference to FIG. 1. The scanner 1 is a device that can read (scan) a manuscript 90 by being held by a user and arranged on the manuscript 90 on a desktop, or by the manuscript 90 being arranged on the top side of the scanner 1 (refer to FIG. 3 and FIG. 4).

As shown in FIG. 1, the scanner 1 is provided with a rectangular housing 2 whose long sides extend in the main scanning direction 81. A rectangular opening 21, which penetrates through to the interior of the scanner 1, is provided in the center of the top surface of the housing 2. A manuscript contact surface 311 and a plate portion 4 of a transparent plate 3 are provided on the inside of the opening 21. The transparent plate 3 is a transparent plate shaped member that is formed of acrylic, for example, and part of the top surface of the transparent plate 3 is the manuscript contact surface 311. The manuscript contact surface 311 is provided roughly in the center of the top surface of scanner 1. When the scanner 1 performs reading, the manuscript contact surface 311 comes into contact with the manuscript 90 (refer to FIG. 3 and FIG. 4). The plate portion 4 is provided on the left side of the manuscript contact surface 311. The length of the plate portion 4 in the main scanning direction 81 is roughly the same as that of the manuscript contact surface 311, and the length of the plate portion 4 in the sub-scanning direction 82 is shorter than the length of the manuscript contact surface 311 in the sub-scanning direction 82. A bottom surface of the plate portion 4 is provided with a sheet 43 (refer to FIG. 3) that is used for calibration.

Figure 2:
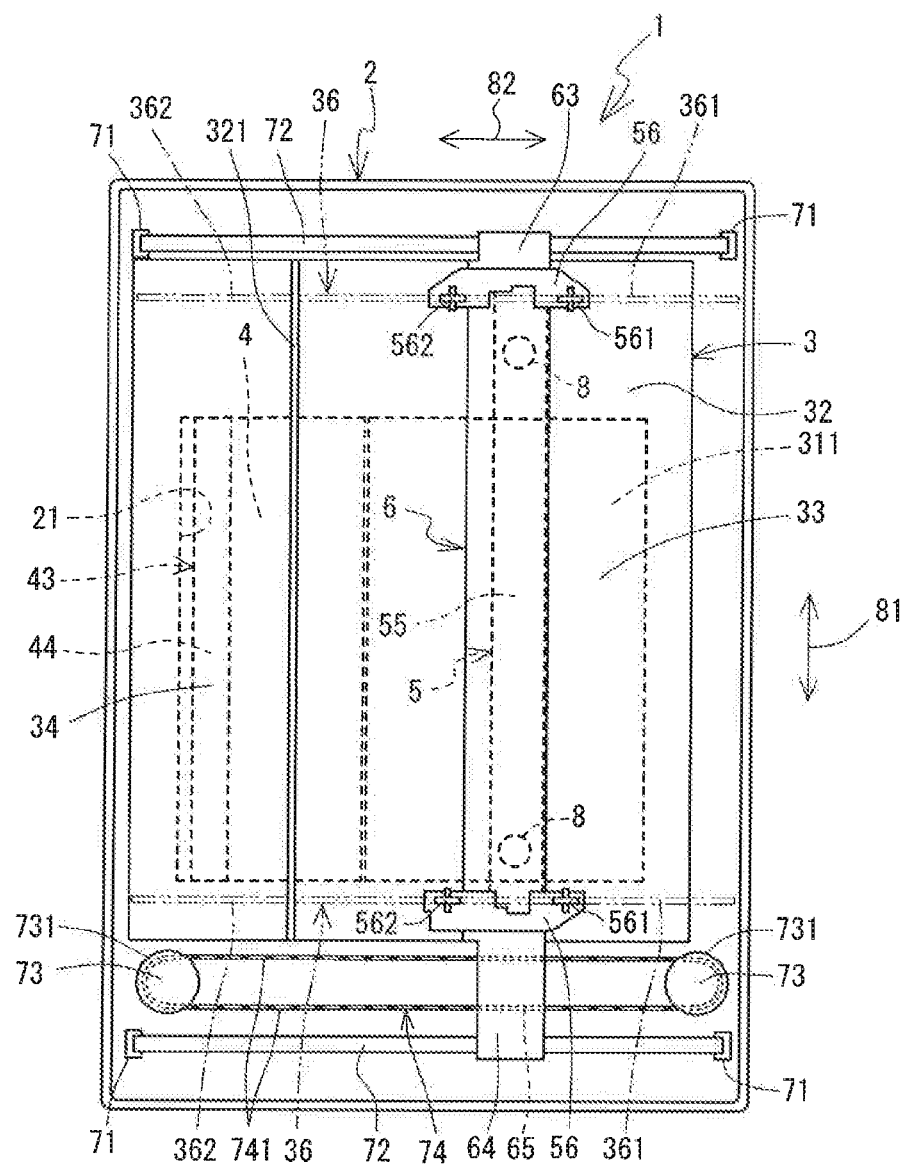
FIG. 2 is a diagram of an internal configuration of an upper portion of the scanner 1, as seen from below.
Figure 3:
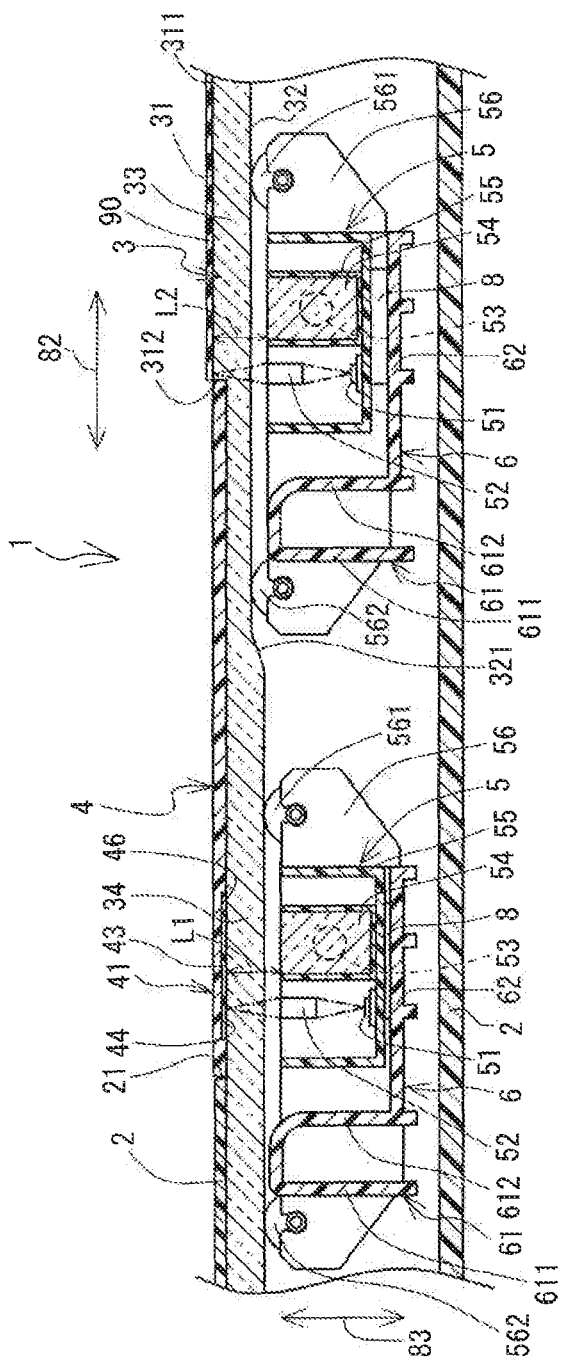
FIG. 3 is a cross-sectional view of the scanner 1 as seen in the direction of arrows along a line I-I shown in FIG. 1.

An internal configuration of the scanner 1 will be explained with reference to FIG. 2 and FIG. 3. As shown in FIG. 2 and FIG. 3, a moving portion 6, which is long in the main scanning direction 81, is provided in the interior of the scanner 1. The moving portion 6 can move in the sub-scanning direction 82. The moving portion 6 moves the detecting portion 5 in the sub-scanning direction 82 while supporting the detecting portion 5. A mechanism that moves the moving portion 6 will be explained later.

As shown in FIG. 3, the moving portion 6 is provided with a left end wall 61 and a bottom wall 62. The left end wall 61 is a wall portion of the left end of the moving portion 6. The left end wall 61 is provided with a first wall portion 611 and a second wall portion 612. The first wall portion 611 extends in the height direction 83 at the rear end of the moving portion 6. The second wall portion 612 first extends to the right from the upper end of the first wall portion 611 and then extends downward. The bottom wall 62 extends to the right from a lower portion of the second wall portion 612 of the left end wall 61.

The bottom wall 62 of the moving portion 6 supports elastic members 8 and the detecting portion 5. Each of the elastic members 8 is, for example, a coil-shaped compression spring. Each of the elastic members 8 is provided between the bottom wall 62 of the moving portion 6 and an element storage portion 55 (to be explained later) of the detecting portion 5. Two of the elastic members 8 are provided (refer to FIG. 2), namely, one each on the upper side of both ends of the bottom wall 62. The elastic members 8 urge the detecting portion 5 (the element storage portion 55), which is arranged on the upper side of the elastic members 8, in the upward direction.

As shown in FIG. 2 and FIG. 3, the detecting portion 5 includes the element storage portion 55, wheel support portions 56, wheels 561 and 562, the detecting elements 51, a lens 52, a light source 53 and a light guide plate 54. As an example, in the present embodiment, the detecting portion 5 is a contact image sensor (CIS) type detecting portion. The detecting portion 5 is provided on the lower side of the transparent plate 3. The wheel support portions 56 are arranged, respectively, on the lower side of both end portions of the transparent plate 3 in the main scanning direction 81. In the sub-scanning direction 82, the wheel support portions 56 are longer than the element storage portion 55. Each of the wheels 561 is rotatably supported by the upper end of the right end portion of each of the wheel support portions 56. Further, each of the wheels 562 is rotatably supported by the upper end of the left end portion of each of the wheel support portions 56. The wheels 561 and 562 come into contact with a contact surface 36 (to be explained later) of the transparent plate 3, due to a depressing force of the detecting portion 5 that is urged by the elastic member 8, and the wheels 561 and 562 thus rotate in accordance with movement of the moving portion 6 and guide the detecting portion 5.

As shown in FIG. 2, the element storage portion 55, which is long in the main scanning direction 81, is provided between the two wheel support portions 56. As shown in FIG. 2 and FIG. 3, the element storage portion 55 is arranged on the upper side of the elastic members 8. The element storage portion 55 is elastically urged upward by the elastic members 8.

As shown in FIG. 3, in the main scanning direction 81, the element storage portion 55 is provided with the plurality of detecting elements 51 that detect light. The lens 52 is provided on the upper side of the plurality of detecting elements 51. The lens 52 is, for example, a SELFOC (registered trademark) lens. The light source 53 is provided on one end portion, in the main scanning direction 81, of the element storage portion 55. The light source 53 is formed of a light emitting diode (LED), for example. The light guide plate 54 is provided on the element storage portion 55 such that the light guide plate 54 extends in the main scanning direction 81 from the end portion on which the light source 53 is provided. The light that is emitted from the light source 53 is irradiated upward across the main scanning direction 81 via the light guide plate 54. When the scanner 1 reads the manuscript, the moving portion 6 moves the detecting portion 5 to the right side in the sub-scanning direction 82 while the light source 53 irradiates the light. The detecting elements 51 detect the reflected light.

The transparent plate 3 faces the detecting portion 5 that is moved in the sub-scanning direction 82 by the moving portion 6. As shown in FIG. 2, the end portions of the transparent plate 3 are arranged further to the outside of the manuscript contact surface 311 in the front-rear direction and the left-right direction. More specifically, the end portion on the front side of the transparent plate 3 (the lower side in FIG. 2) is positioned to the rear side of a belt 74 (to be explained later). The end portion on the rear side of the transparent plate 3 (the upper side in FIG. 2) is positioned to the front side of a rear side rail 72 (to be explained later). The end portions in the left-right direction of the transparent plate 3 are each positioned on the left and right end portions of the housing 2.

As shown in FIG. 3, of the surface of the transparent plate 3 in the height direction 83, the lower side of the surface is a facing surface 32 that faces the detecting portion 5. Of the transparent plate 3, a surface on the opposite side to the facing surface 32 (namely, a surface on the upper side) is referred to as an upper surface 31. Part of the upper surface 31 is the manuscript contact surface 311.

In the following explanation, of the transparent plate 3, a section that includes the manuscript contact surface 311 (a section that includes the manuscript contact surface 311 and that is on the lower side of the manuscript contact surface 311) is referred to as a first component portion 33. Further, of the transparent plate 3, a section on which a reference member 41 (to be explained later) is arranged (that is, a section of the transparent plate 3 that is positioned on the lower side of the reference member 41) is referred to as a second component portion 34.

As shown in FIG. 3, the second component portion 34 is arranged to the left of the first component portion 33 in the sub-scanning direction 82. The second component portion 34 has the same thickness as the first component portion 33. A height position of the second component portion 34 is positioned on the lower side of the manuscript contact surface 311 of the first component portion 33. A step portion 321 is provided between the first component portion 33 and the second component portion 34 on the facing surface 32. The step portion 321 corresponds to the difference in height positions between the first component portion 33 and the second component portion 34 in the sub-scanning direction 82. The step portion 321 is a step portion that is inclined diagonally to the right and upward (refer to FIG. 3). The step portion 321 is provided across the transparent plate 3 in the main scanning direction 81 (refer to FIG. 2). A step portion 312 is provided on the upper surface 31, on the left end of the manuscript contact surface 311. The step portion 312 corresponds to the difference in height positions between the first component portion 33 and the second component portion 34. The step portion 312 is a step portion that is parallel to the height direction 83.

Of the facing surface 32, a surface that comes into contact with the wheels 561 and 562 of the detecting portion 5 is referred to as the contact surface 36. Expressed differently, the contact surface 36 is a surface that is extended toward the outside, in the main scanning direction 81, of the facing surface 32 of the transparent plate 3. As shown in FIG. 2, the contact surface 36 is provided further to the outside, in the main scanning direction 81, than the first component portion 33 and the second component portion 34. Of the contact surface 36, a surface that is positioned on the outside of the first component portion 33, in the main scanning direction 81, is referred to a first contact surface 361. Of the contact surface 36, a surface that is positioned on the outside of the second component portion 34, in the main scanning direction 81, is referred to as a second contact surface 362. Height positions of the bottom surfaces of the first contact surface 361 and the first component portion 33 are the same. Height positions of the bottom surfaces of the second contact surface 362 and the second component portion 34 are the same. As a result, a difference between the height position of the first contact surface 361 and the height position of the second contact surface 362 is the same as the difference between the height position of the bottom surface of the first component portion 33 and the height position of the bottom surface of the second component portion 34.

As shown in FIG. 3, the plate portion 4 is arranged between the step portion 312 and the opening 21 of the housing 2, on the upper side of the upper surface 31 of the transparent plate 3. A concave portion 46 is provided on the bottom surface of the left portion of the plate portion 4, such that the plate portion 4 is concave in the upward direction across the main scanning direction 81. The sheet 43 for calibration, which is long in the main scanning direction 81, is arranged on the concave portion 46. A section of the plate portion 4 that is on the upper side of the sheet 43 and the sheet 43 are referred to as the reference member 41. The reference member 41 is positioned to the left of the manuscript contact surface 311. Thus, the reference member 41 does not overlap with the manuscript contact surface 311 in the sub-scanning direction 82. A surface of the reference member 41 that faces the detecting portion 5 (the bottom surface of the sheet 43 in the present embodiment) is referred to as a first surface 44. The first surface 44 is in contact with the second component portion 34 of the transparent plate 3. A color of the first surface 44 includes a reference color that is used to perform calibration of the scanner 1. In the present embodiment, as an example, it is assumed that the first surface 44 is formed of a white color that is used as the reference color to perform calibration.

The plate portion 4 inhibits light from outside the scanner 1 (light from above) from permeating through to the sheet 43. The height position of the upper surface of the plate portion 4 is the same as the height position of the manuscript contact surface 311. Therefore, the height position of the reference member 41 is the same as the height position of the manuscript contact surface 311. With this configuration, the plate portion 4 (the reference member 41) and the manuscript contact surface 311 are formed to be flat.

The mechanism that moves the moving portion 6 will be explained. As shown in FIG. 2, strut portions 71 are provided, extending downward (toward the front in FIG. 2), in four corners inside the scanner 1 (the four corners on the reverse surface of the upper portion of the housing 2). The rails 72, which extend in the sub-scanning direction 82, are provided at each of the end portions of the scanner 1 in the main scanning direction 81. The ends of each of the rails 72 are supported by the lower ends of the strut portions 71. Thus, the rails 72 are separated downward from the reverse surface of the upper portion of the housing 2.

The belt 74 and two pulleys 73 are provided in front of the rear side (the lower side in FIG. 2) rail 72. The two pulleys 73 are provided separated from each other on the end portions of the scanner 1 in the sub-scanning direction 82. Each of the pulleys 73 is circular and can rotate. Each of the pulleys 73 has a flange portion 731 around its outer perimeter. Each of the flange portions 731 guides the belt 74. In a state of being guided by the flange portions 731, the belt 74 is stretched between the two pulleys 73. The left side pulley 73 is connected to a motor (not shown in the drawings) via a gear (not shown in the drawings).

A front end portion 63 of the moving portion 6 extends further toward the front side than the wheel support portion 56 on the front side (the upper side in FIG. 2). The front end portion 63 is engaged with the front side rail 72 such that the front end portion 63 can move in the sub-scanning direction 82. A rear end portion 64 of the moving portion 6 extends further toward the rear side than the wheel support portion 56 on the rear side (the lower side in FIG. 2). The rear end portion 64 passes on the lower side of the belt 74 and is engaged with the rear side rail 72 such that the rear end portion 64 can move in the sub-scanning direction 82. The rear end portion 64 is fixed to one location on the belt 74. More specifically, two sections 741 of the belt 74 that extend in parallel to each other in the sub-scanning direction 82 are formed by the belt 74 being stretched between the two pulleys 73. The rear end portion 64 of the moving portion 6 is fixed to the rear side section 741, of the two sections 741 of the belt 74. In FIG. 2, a fixing portion 65 is illustrated, which is a section at which the rear end portion 64 of the moving portion 6 is fixed to the belt 74.

When the moving portion 6 moves in the sub-scanning direction 82, the motor (not shown in the drawings) rotates and rotates the left side pulley 73. When the left side pulley 73 rotates, the belt 74 is fed. The right side pulley 73 rotates in accordance with the feeding of the belt 74. The two pulleys 73 rotate and the belt 74 is thus fed smoothly. The rear end portion 64 of the moving portion 6 is fixed to the belt 74 at the fixing portion 65. Thus, when the belt 74 is fed, the moving portion 6 moves along the two rails 72 in the sub-scanning direction 82.

Next, with reference to FIG. 3, a case will be explained in which the scanner 1 reads the manuscript 90 in a state in which the manuscript 90 is arranged on the scanner 1. The scanner 1 of the present embodiment always performs calibration before reading the manuscript 90. The movement of the moving portion 6, the emitting of light by the light source 53 and the detecting by the detecting elements 51 etc. that are explained below are performed by the control of a control circuit (not shown in the drawings) of a CPU or the like that is provided in the scanner 1.

As shown in FIG. 3, the manuscript 90 is arranged on the upper side of the manuscript contact surface 311. When the scanner 1 reads the manuscript 90, the moving portion 6 and the detecting portion 5 move to the lower side of the reference member 41 (to a position facing the reference member 41). In other words, the moving portion 6 and the detecting portion 5 move to a position shown on the left side in FIG. 3. The light source 53 emits light and the light is irradiated toward the first surface 44 of the reference member 41 via the light guide plate 54. The detecting elements 51 and the lens 52 are formed such that the focus of the detecting elements 51 is focused on the first surface 44. Thus, the light that is reflected back from the first surface 44 is accurately detected by the plurality of detecting elements 51. The detecting elements 51 each output an output value depending on the detected reflected light to a control circuit (not shown in the drawings).

The control circuit of the scanner 1 detects the output value of each of the detecting elements 51. The first surface 44 is white. Thus, even when the plurality of detecting elements 51 have detected the same color white, there are variations in the output values of the plurality of detecting elements 51. Therefore, the output value of each of the detecting elements 51 is compared with a reference value that is stored in advance in a storage unit such as a ROM (not shown in the drawings) etc., and a coefficient to be multiplied by the output value of each of the detecting elements 51 is calculated such that the output value matches the reference value. Later, when the manuscript 90 is read, the output value of each of the detecting elements 51 is multiplied by the calculated coefficient. In this manner, when reading the manuscript 90, the scanner 1 can reduce the impact of the variations of the detecting elements 51. In other words, calibration is performed. Note that, the method of calibration through multiplication of the above-described coefficient is an example, and a various known methods of calibration can be adopted.

When the calibration is ended, the moving portion 6 moves to the right in the sub-scanning direction 82. The detecting portion 5 moves to the lower side of the manuscript contact surface 311. The detecting portion 5 is urged upward by the elastic member 8. Thus, when the moving portion 6 moves to the right in the sub-scanning direction 82, the wheels 561 and 562 move upward along the step portion 321 of the transparent plate 3. As a result, the whole detecting portion 5 moves upward due to the urging force of the elastic member 8.

While moving to the right in the sub-scanning direction 82 on the lower side of the manuscript contact surface 311 (the lower side of the first component portion 33), the detecting portion 5 reads the manuscript 90 (the detecting portion 5 on the right side in FIG. 3). At this time, the focus of the detecting elements 51 is focused on the manuscript 90. In other words, the focus of the detecting elements 51 is focused on the first surface 44 and the manuscript 90. Thus, the scanner 1 can accurately perform the calibration by reading the first surface 44 and can accurately read the manuscript 90.

The principle of focusing on both the first surface 44 and the manuscript 90 will be explained. Whether the focus of the detecting elements 51 is in focus depends on the environment between the surface that is the target of the reading and the detecting portion 5. For example, when the thickness of the transparent plate 3 (the second component portion 34) between the first surface 44 and the detecting portion 5 is different to the thickness of the transparent plate 3 (the first component portion 33) between the manuscript 90 and the detecting portion 5, the focal distance of the detecting elements 51 changes. Similarly, when the refractive index is different due to the material of the second component portion 34 being different to the material of the first component portion 33, the focal distance of the detecting elements 51 changes. Thus, for example, even if the focus of the detecting elements 51 is focused on the first surface 44, the focus of the detecting elements 51 is not focused on the manuscript 90. Even if the thickness and the refractive index of the first component portion 33 are the same as those of the second component portion 34, if a distance L1 between the first surface 44 and the detecting portion 5 (the element storage portion 55) and a distance L2 between the manuscript 90 and the detecting portion 5 are different, even if the focus of the detecting elements 51 is focused on the first surface 44, for example, the focus of the detecting elements 51 is not focused on the manuscript contact surface 311.

In the present embodiment, the thickness of the first component portion 33 and the second component portion 34 is the same. The first component portion 33 and the second component portion 34 are formed of the single plate of the transparent plate 3. Thus, the material of the first component portion 33 and the second component portion 34 is the same and the refractive index is the same. The height position of the first surface 44 and the height position of the manuscript contact surface 311 are different, but the detecting portion 5 moves up and down in response to the difference in heights. As a result, the distance L1 between the first surface 44 and the detecting portion 5, and the distance L2 between the manuscript 90 (which comes into contact with the manuscript contact surface 311) and the detecting portion 5 are the same. Thus, the environment between the first surface 44 and the detecting portion 5 and the environment between the manuscript 90 and the detecting portion 5 are the same. Therefore, the focus of the detecting elements 51 is focused on both the first surface 44 and the manuscript 90. As a result, the scanner 1 can accurately perform the calibration by reading the first surface 44 and can accurately read the manuscript 90.

Figure 4:
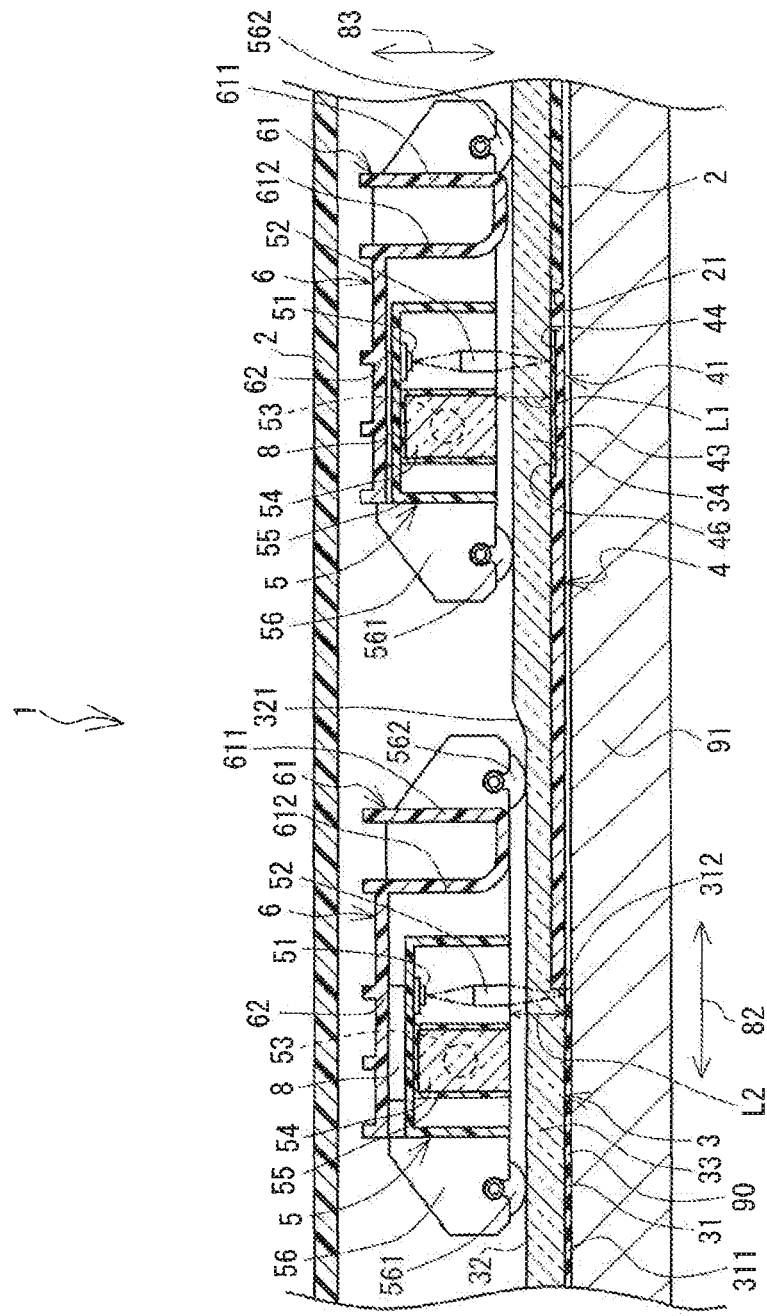
FIG. 4 is a diagram showing the scanner 1 when reading a manuscript 90 that is placed on a desk 91.

With reference to FIG. 4, a case will be explained in which the scanner 1 reads the manuscript 90 that is placed on top of a desk 91. As shown in FIG. 4, the scanner 1 is arranged such that the manuscript contact surface 311 comes into contact with the manuscript 90 on top of the desk 91. For example, when the reference member 41 protrudes further than the manuscript contact surface 311, the upper surface of the protruding reference member 41 comes into contact with the desk 91. Thus, the manuscript contact surface 311 is separated from the manuscript 90 that is on top of the desk 91. It is therefore possible that the manuscript 90 cannot be accurately read. However, in the present embodiment, the reference member 41 does not protrude further than the manuscript contact surface 311. Thus, the scanner 1 can appropriately cause the manuscript contact surface 311 to come into contact with the manuscript 90. As a result, the scanner 1 can accurately read the manuscript 90.

The scanner 1 of the present embodiment is configured as described above. In the present embodiment, the contact surface 36 of the transparent plate 3, with which the wheels 561 and 562 of the detecting portion 5 come into contact, is formed as a surface that extends to the outside of the facing surface 32 of the transparent plate 3 in the main scanning direction 81 (refer to FIG. 2). Thus, the contact surface 36, the first component portion 33 and the second component portion 34 are all formed by the single plate of the transparent plate 3. As a result, in comparison to a case in which the contact surface 36 is formed as a separate component from the first component portion 33 and the second component portion 34, it is possible to reduce the manufacturing costs of the scanner 1.

The difference between the height position of the first contact surface 361 and the height position of the second contact surface 362 is the same as the difference between the height position of the bottom surface of the first component portion 33 and the height position of the bottom surface of the second component portion 34. Thus, when the wheels 561 and 562 move while coming into contact with the first contact surface 361 and the second contact surface 362, the detecting portion 5 moves up and down by the length of the difference between the height position of the bottom surface of the first component portion 33 and the height position of the bottom surface of the second component portion 34. Further, the thickness of the first component portion 33 is the same as the thickness of the second component portion 34. Thus, the conditions (the environment) when the detecting elements 51 read the first surface 44 that is arranged on the upper side of the second component portion 34 are the same as the conditions (the environment) when the detecting elements 51 read the manuscript 90 that is in contact with the manuscript contact surface 311 of the first component portion 33. As a result, the scanner 1 can accurately perform calibration and can accurately read the manuscript 90.

Further, as shown in FIG. 3, in the present embodiment, it is possible to focus on the first surface 44 and on the manuscript 90 without changing the focal distance of the lens 52. Therefore, in the scanner 1, the structure of the lens 52 can be simplified, compared to a case in which the focal distance of the lens 52 is made to be variable.

It should be noted that the present disclosure is not limited to the above-described embodiment, and various modifications are possible. For example, the reference color of the first surface 44 may be white and black.

In place of the wheels 561 and 562, for example, a member that can be slidably in contact with the contact surface 36 may guide the detecting portion 5.

The scanner 1 may be a device that is connected to an external device, such as a personal computer (hereinafter referred to as a PC) or the like, or may be a device that is not connected to an external device.

In place of the control circuit of the scanner 1, the PC or the like that is connected to the scanner 1 may use the output values of the detecting elements 51 acquired via the scanner 1, for example, and may perform the calculations for the calibration.

The calibration is explained above using an exemplified case in which the impact of the variations between the detecting elements 51 is reduced, but the present disclosure is not limited to that example. For example, in a case in which the light source 53 deteriorates, the calibration can similarly be performed such that the impact of that deterioration on the scanner 1 is reduced.

In addition to the scanner 1, a multiple function processing machine that has a copy function and a scanner function may also be given as an example of the image reader of the present disclosure.

In addition to acrylic, glass or polycarbonate or the like can be used as the material of the transparent plate 3, for example.

The height position of the upper surface of the plate portion 4 need not necessarily be the same as the height position of the manuscript contact surface 311. For example, by making the plate portion 4 thinner, the height position of the upper surface of the plate portion 4 may be formed to be below the height position of the manuscript contact surface 311. In this case, the height position of the reference member 41 is below the height position of the manuscript contact surface 311. With this structure, even if variations in the accuracy of assembly of the plate portion 4, the sheet 43 and the transparent plate 3 occur at the time of manufacture, the reference member 41 does not protrude above the manuscript contact surface 311. Thus, similarly to the case shown in FIG. 4, for example, it is possible to cause the manuscript contact surface 311 to come into contact with the manuscript 90 that is placed on top of the desk 91. The scanner 1 can therefore accurately read the manuscript 90.

The reference member 41 is formed by part of the plate portion 4 and the sheet 43, and the first surface 44 of the sheet 43 is formed of the reference color, but the present disclosure is not limited to this example. For example, the reference member 41 may be formed by a plate-shaped member that has thickness, without providing the sheet 43. Then, the first surface 44 that is used for the calibration may be formed by making the bottom surface of the reference member 41 the reference color, for example, by forming the whole reference member 41 with the material of the reference color, or by coating the bottom surface of the reference member 41 with a paint of the reference color.

The environment between the first surface 44 and the detecting portion 5 and the environment between the manuscript 90 and the detecting portion 5 need not necessarily be the same. The environments may be slightly different, within a range in which the calibration can be performed and the manuscript 90 can be read (a range in which the focus of the detecting elements 51 can be focused on the first surface 44 and on the manuscript 90). For example, it is sufficient if the distance L1 between the first surface 44 and the detecting portion 5 and the distance L2 between the manuscript contact surface 311 and the detecting portion 5 are substantially the same, and need not be precisely the same. It is sufficient if the thickness of the first component portion 33 and the thickness of the second component portion 34 are substantially the same and need not be precisely the same.

The contact surface 36 with which the wheels 561 and 562 come into contact may be formed by a surface on the inside of the housing 2, for example.

The height position of the first contact surface 361 may be different from the height position of the bottom surface of the first component portion 33, and the height position of the second contact surface 362 may be different from the height position of the bottom surface of the second component portion 34. In this case, it is sufficient if the difference between the height position of the first contact surface 361 and the height position of the second contact surface 362 is substantially the same as the difference between the height position of the bottom surface of the first component portion 33 and the height position of the bottom surface of the second component portion 34. In this case, the detecting portion 5 can move in the height direction 83 corresponding to the difference in the height positions of the first component portion 33 and the second component portion 34. Thus, the scanner 1 can accurately perform the calibration and can accurately read the manuscript 90.

The first component portion 33 and the second component portion 34 are formed of the single plate of the transparent plate 3. As a result, the refractive index of the first component portion 33 is the same as that of the second component portion 34, but the present disclosure is not limited to this example. For example, the first component portion 33 and the second component portion 34 may be formed separately from materials having a different refractive index. In this case, when adjusting the focal distance of the detecting elements 51 to focus on both the first surface 44 and the manuscript 90, it is necessary to change the thickness of the first component portion 33 and the second component portion 34. As a result, the thickness of the first component portion 33 and the thickness of the second component portion 34 are different. However, the detecting portion 5 of the present embodiment can move in the height direction 83 when moving in the sub-scanning direction 82, and so, even if the thicknesses of the first component portion 33 and the second component portion 34 are different, the detecting portion 5 can move in the height direction 83 corresponding to the different thicknesses. Thus, the detecting elements 51 can focus on the first surface 44 that is arranged on the upper side of the second component portion 34 and on the manuscript 90 that is arranged on the upper side of the first component portion 33. Accordingly, the scanner 1 can accurately perform the calibration and can accurately read the manuscript 90.

Figure 5:
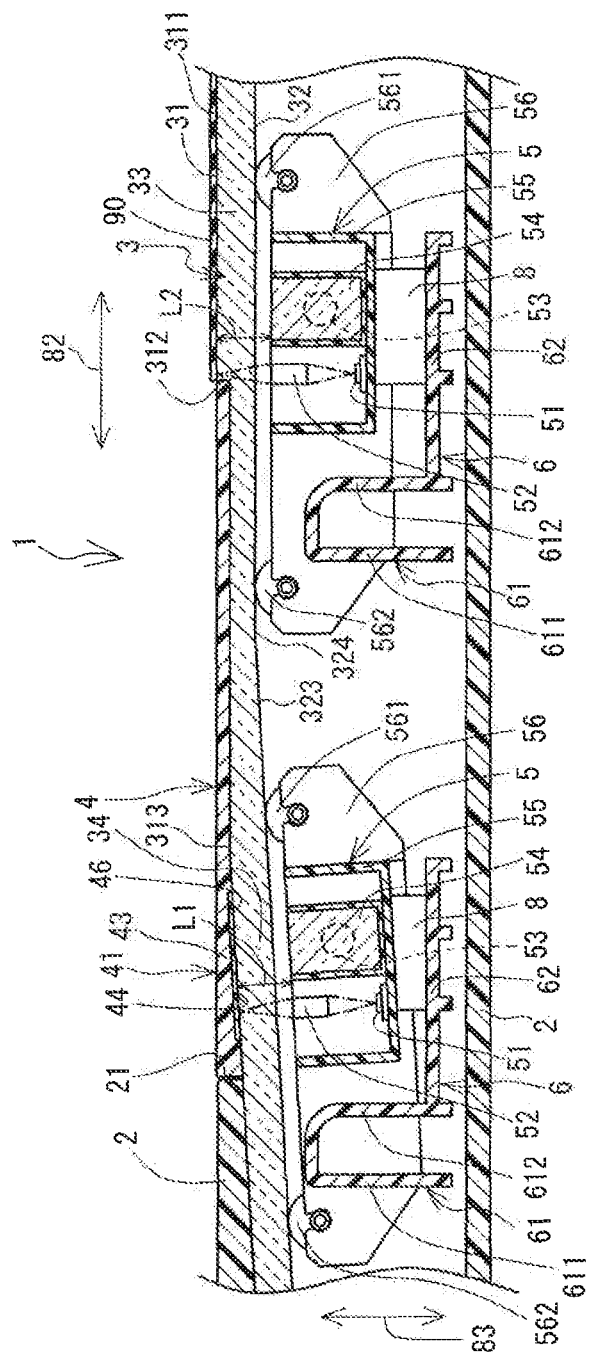
FIG. 5 is a cross-sectional view of the scanner 1 according to a second embodiment.

The step portion 321 is formed in the transparent plate 3 and the first surface 44 is provided in parallel to the sub-scanning direction 82, but the present disclosure is not limited to this example. Hereinafter, a second embodiment, which is a modified example of the first embodiment, will be explained. The scanner 1 of the second embodiment shown in FIG. 5 differs from the first embodiment in that the step portion 321 is not formed. The second component portion 34 of the transparent plate 3 is inclined diagonally downward such that it is positioned lower and lower the further it is separated from the first component portion 33 to the left in the sub-scanning direction 82. In other words, the second component portion 34 is inclined downward to the left. The facing surface 32 includes a bent surface 323, which is a surface that, after extending to the left side from the first component portion 33, bends diagonally downward and to the left and extends toward the second component portion 34. The bent surface 323 has a bent portion 324, which is the portion at which the bent surface 323 bends diagonally downward and to the left, and which is positioned in a central portion between the first component portion 33 and the second component portion 34.

The upper surface of the plate portion 4 is bent downward and to the left, from slightly to the right of the second component portion 34. This bent section is referred to as a bent portion 313. The first component portion 33 and the second component portion 34 have the same thickness. The sheet 43 is arranged on the upper side of the second component portion 34. Thus, the first surface 44 is inclined diagonally along the second component portion 34. Similarly to the case of the first embodiment, the upper surface of the plate portion 4 (the reference member 41) and the manuscript contact surface 311 are formed to be flat.

The moving portion 6 moves in the sub-scanning direction 82 in a similar manner to the first embodiment. When the detecting portion 5 is on the lower side of the first surface 44, the detecting portion 5 is urged upward by the elastic member 8 and is inclined in accordance with the inclination of the second component portion 34. As a result, the angle of inclination of the first surface 44 and the angle of inclination of the detecting portion 5 are the same. After the calibration is finished, when the detecting portion 5 moves to the right in the sub-scanning direction 82, the wheels 561 and 562 pass along the bent portion 324. When the detecting portion 5 is on the lower side of the manuscript contact surface 311, the detecting portion 5 does not incline and is positioned in parallel with the manuscript contact surface 311.

In the case of the present embodiment, in a similar manner to the first embodiment, the distance L1 between the first surface 44 and the detecting portion 5 and the distance L2 between the manuscript 90 and the detecting portion 5 are the same. Thus, the scanner 1 can accurately perform the calibration and can accurately read the manuscript 90. Similarly to the first embodiment, the manuscript contact surface 311 and the top surface of the reference member 41 are formed to be flat. Thus, the scanner 1 can accurately read the manuscript 90 that is placed on the desk 91 (refer to FIG. 4). In the present embodiment, in comparison to the first embodiment, the step portion 321 is not formed in the facing surface 32. Thus, in the scanner 1, there is no risk that the detecting portion 5 (the element storage portion 55) will come into contact with the step portion of the facing surface 32 of the transparent plate 3 and it is possible to reliably inhibit the contact.

Figure 6:
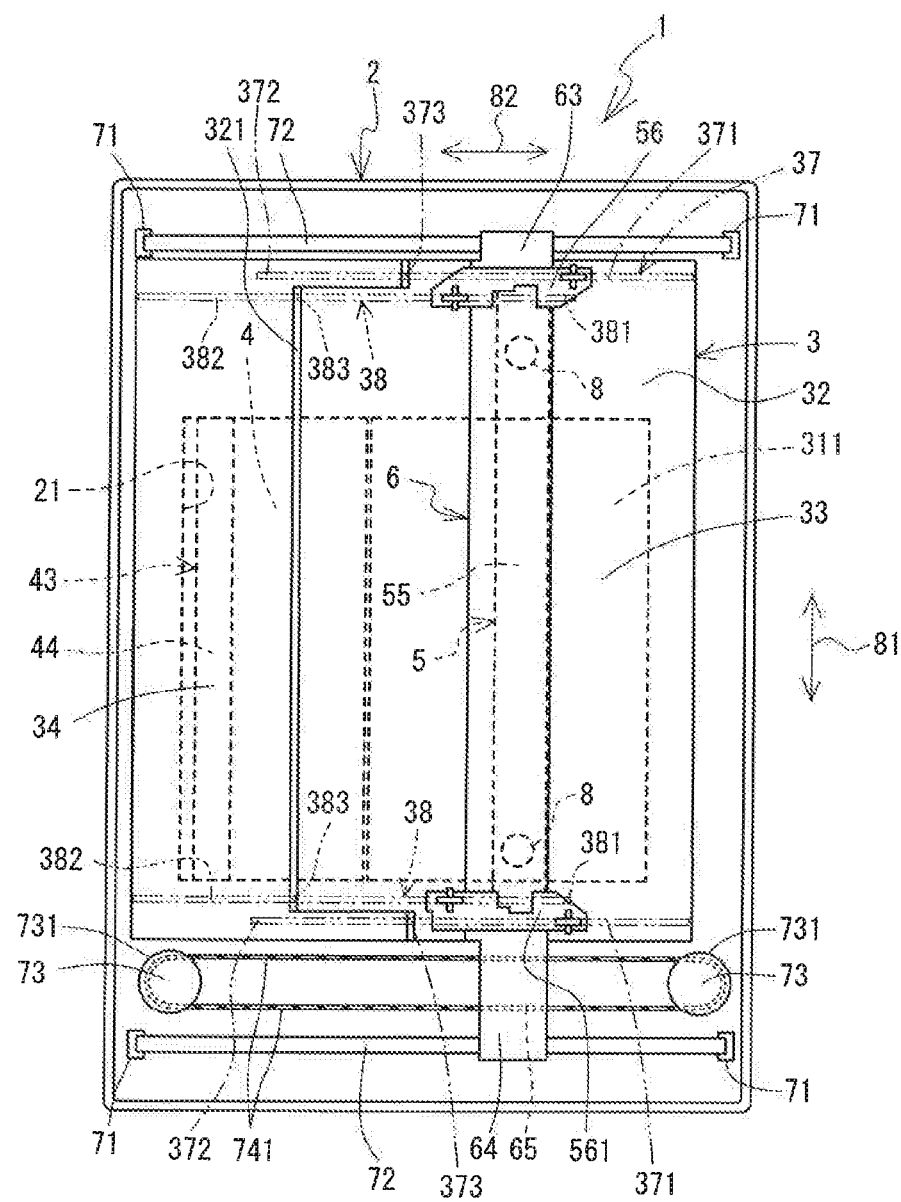
FIG. 6 is a diagram of an internal configuration of the upper portion of the scanner 1 according to a third embodiment, as seen from below.

Further, in the first embodiment, when the detecting portion 5 moves in the sub-scanning direction 82, the wheels 562 pass the step portion 321 after the wheels 561 have passed the step portion 321. In other words, the timing at which the wheels 561 and the wheels 562 pass the step portion 321 is different, but the present disclosure is not limited to this example. For example, the wheels 561 and the wheels 562 may pass the step portion simultaneously. Hereinafter, a third embodiment, which is a modified example of the first embodiment, will be explained with reference to FIG. 6 to FIG. 8. As shown in FIG. 6, in the third embodiment, the wheels 561 and 562 (refer to FIG. 2) that are separated from each other in the sub-scanning direction 82 in the first embodiment, are also separated from each other in the main scanning direction 81. More specifically, the wheel 561 on the front side (the upper side in FIG. 6) is positioned further to the front side than the wheel 562. Further, the wheel 561 on the rear side (the lower side in FIG. 6) is positioned further to the rear side than the wheel 562.

In the present embodiment, a section of the facing surface 32 with which the wheels 561 are in contact is referred to as a contact surface 37. A section of the facing surface 32 with which the wheels 562 are in contact is referred to as a contact surface 38. Of the contact surface 37, a surface that is positioned on the outside of the first component portion 33 in the main scanning direction 81 is referred to as a first contact surface 371. A surface that is positioned on the outside of the second component portion 34 in the main scanning direction 81 is referred to as a second contact surface 372. Of the contact surface 38, a surface that is positioned on the outside of the first component portion 33 in the main scanning direction 81 is referred to as a first contact surface 381. A surface that is positioned on the outside of the second component portion 34 in the main scanning direction 81 is referred to as a second contact surface 382.

Figure 7:
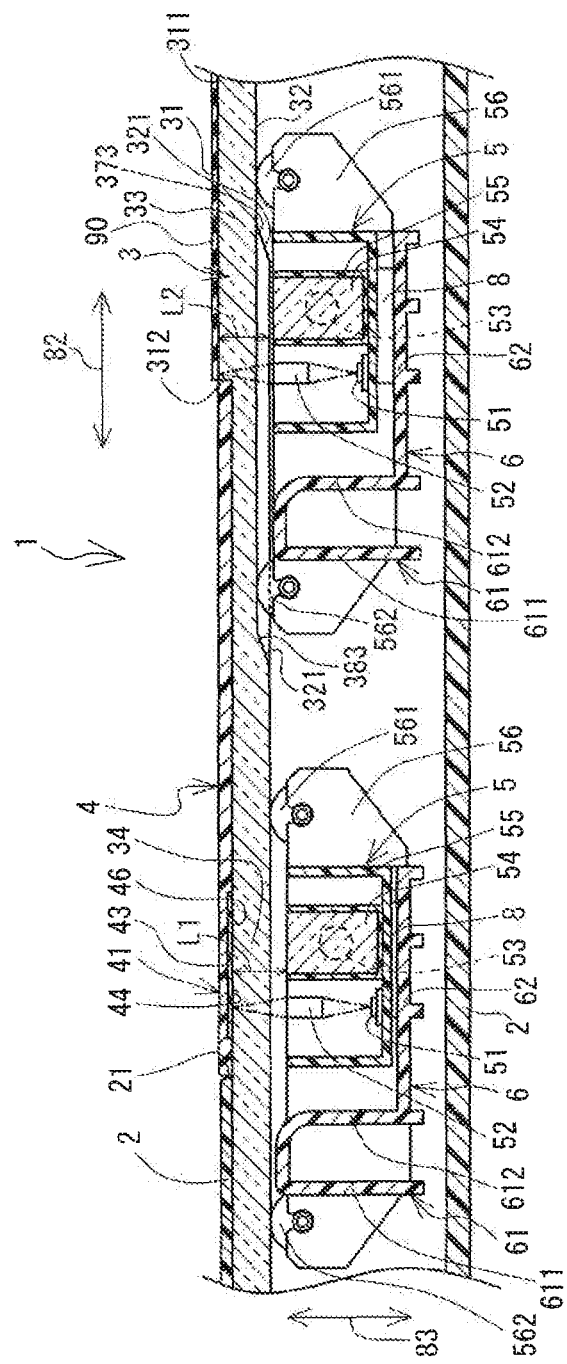
FIG. 7 is a cross-sectional view of the scanner 1 according to the third embodiment.

A step portion 373 that corresponds to a height position between the first contact surface 371 and the second contact surface 372 is provided on the contact surface 37. Similarly, a step portion 383 that corresponds to a height position between the first contact surface 381 and the second contact surface 382 is formed on the contact surface 38. The step portions 373 and 383 are part of the step portion 321. As shown in FIG. 6 and FIG. 7, in comparison to the case of the first embodiment, the ends (in the main scanning direction 81) of the step portion 321 of the present embodiment are positioned further to the right side. The step portions 373, through which the wheels 561 on the right side pass, are provided on the ends of the step portion 321 in the main scanning direction 81. The step portions 383, through which the wheels 562 on the left side pass, are provided on sections other than the ends of the step portion 321 in the main scanning direction 81.

Figure 8:
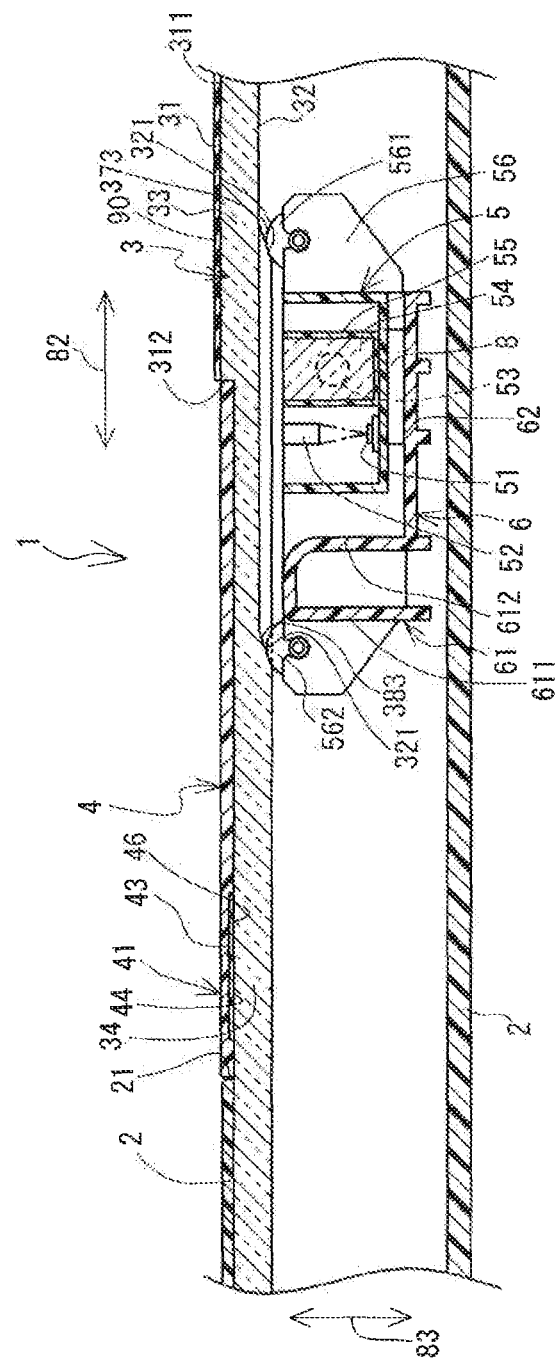
FIG. 8 is a cross-sectional view of the scanner 1 according to the third embodiment, showing a state in which wheels 561 and 562 are passing stepped portions 373 and 383.

The distance between the step portion 373 and the step portion 383 in the main scanning direction 81 and the distance between the step portion 373 and the step portion 383 in the sub-scanning direction 82 are equivalent to the distance between the wheel 561 and the wheel 562 in the main scanning direction 81 and the distance between the wheel 561 and the wheel 562 in the sub-scanning direction 82, respectively. That is, the step portions 373 and 383 are formed in positions corresponding to the interval between the wheels 561 and 562. As a result, when the detecting portion 5 moves in the sub-scanning direction 82, as shown in FIG. 8, all of the wheels 561 and 562 simultaneously pass the step portions 373 and 383 that respectively correspond to the wheels 561 and 562. Thus, when passing the step portions 373 and 383, the detecting portion 5 does not incline diagonally (refer to FIG. 8). Thus, the scanner 1 can inhibit the detecting portion 5 from becoming inclined and can inhibit the detecting portion 5 (the element storage portion 55) from coming into contact with the step portions.

What is claimed is:

1. An image reader comprising:
   a moving portion that is configured to move in a first scanning direction;
   a transparent plate that has a facing surface and an opposite surface that is a surface on an opposite side to the facing surface and of which at least a part is a manuscript contact surface, the manuscript contact surface being a surface that comes into contact with a manuscript that is a reading target;
   a reference member that is provided in at least one of
     a position that is not the manuscript contact surface in the first scanning direction, a height position of the reference member being the same as that of the manuscript contact surface, and the height position being a position in a direction that is orthogonal to the first scanning direction and to a second scanning direction that is orthogonal to the first scanning direction, and
     a position that is further to a side in a first direction from the transparent plate than the manuscript contact surface, a color of a first surface that is on the side in the first direction including a reference color that is used for calibration, and the first direction being a direction from the opposite surface toward the facing surface; and
   a detecting portion that faces the facing surface and that includes, in the second scanning direction, a plurality of detecting elements that is configured to detect reflected light of light irradiated from a light source, the detecting portion being supported by the moving portion and being configured to move in the first scanning direction, and a height position of the detecting portion when the reference member is on the side in the first direction being further to the side in the first direction than a height position of the detecting portion when the manuscript contact surface is on the side in the first direction.

2. The image reader according to claim 1, wherein
   the transparent plate includes the manuscript contact surface and further includes
     a first component portion that is a portion of the manuscript contact surface on the side in the first direction, and
     a second component portion that is a portion on which the reference member is arranged, that is positioned further to the side in the first direction than the manuscript contact surface, in the height direction, and to the side of the first component portion in the first scanning direction, and that has a same thickness as the first component portion,
   the reference member is arranged on the second component portion on the side in a second direction that is an opposite direction to the first direction, and
   a distance between the detecting portion and the first surface is the same as a distance between the detecting portion and the manuscript contact surface.

3. The image reader according to claim 2, further comprising:
   an elastic member that is provided between the moving portion and the detecting portion and that elastically urges the detecting portion in the second direction; and
   at least one guide member which is provided on both end portions, in the second scanning direction, of the detecting portion, which comes into contact, as a result of a pressing force of the detecting portion urged by the elastic member, with a contact surface that is a surface provided on the side in the second direction, and which guides the detecting portion in accordance with movement of the moving portion in the first scanning direction,
   wherein the contact surface is provided further to the outside of the first component portion and the second component portion in the second scanning direction, and of the contact surface, a difference between a height position of a first contact surface that is a surface positioned to the outside of the first component portion in the second scanning direction and a height position of a second contact surface that is a surface positioned to the outside of the second component portion in the second scanning direction is the same as a difference between a height position of a surface that is included in the first component portion and a height position of a surface that is included in the second component portion, of the facing surface of the transparent plate.

4. The image reader according to claim 3, wherein
   the contact surface is a surface that is formed by the facing surface of the transparent plate being extended toward the outside in the second scanning direction.

5. The image reader according to claim 3, wherein
the at least one guide member is provided in a plurality on each end portion, in the first scanning direction, of the detecting portion,
the plurality of guide members on the each end portion are separated from each other in the first scanning direction and are separated from each other in the second scanning direction,
a plurality of step portions, which correspond to the height position difference between the first contact surface and the second contact surface, are provided in positions respectively corresponding to intervals between the plurality of guide members, and
when the detecting portion moves in the first scanning direction, all of the plurality of guide members simultaneously pass the respectively corresponding plurality of step portions.

6. The image reader according to claim 3, wherein
the second component portion is inclined diagonally such that the further the second component portion is separated from the first component portion in the first scanning direction, the further the second component portion is positioned on the side in the first direction and
the facing surface includes a surface that, after extending from the first component portion, bends diagonally and extends toward the second component portion.

* * * * *